United States Patent Office 3,558,210
Patented Jan. 26, 1971

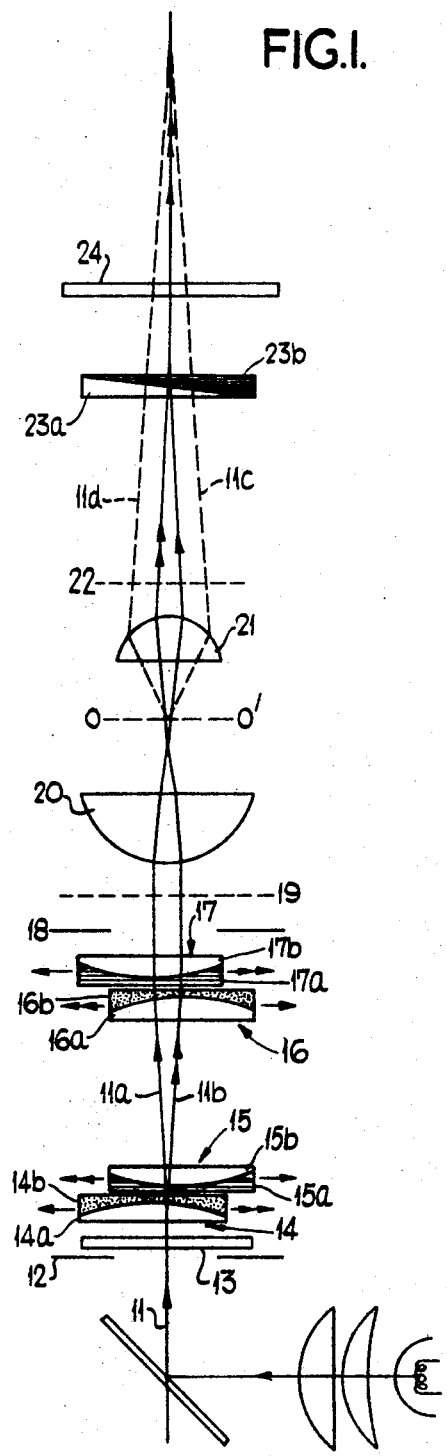
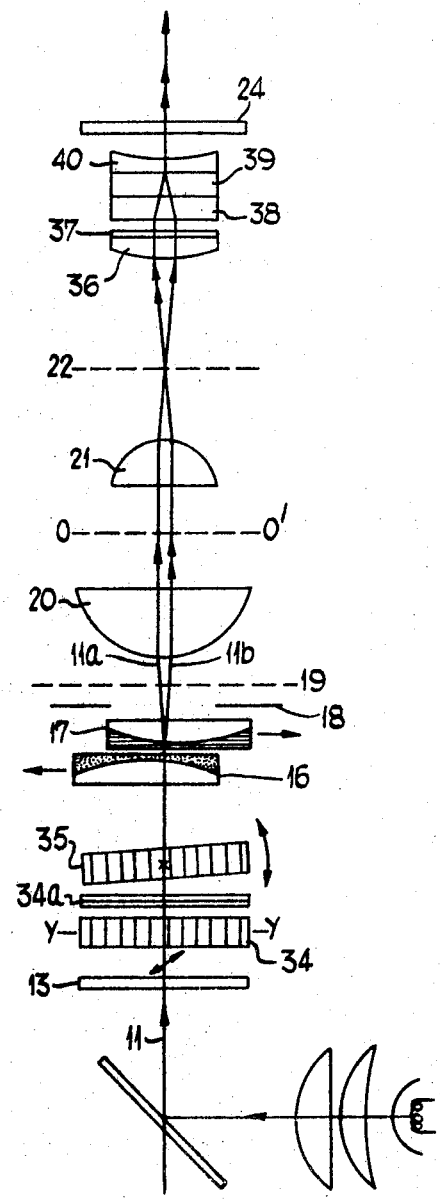

3,558,210
DOUBLE REFRACTING INTERFERENCE MICROSCOPE
Francis Hughes Smith, Surrey, England, assignor to Vickers Limited, London, England, a British company
Filed July 30, 1969, Ser. No. 846,205
Claims priority, application Great Britain, Aug. 2, 1968, 37,087/68
Int. Cl. G02b 21/14
U.S. Cl. 350—12          7 Claims

ABSTRACT OF THE DISCLOSURE

In an interference microscope of the kind in which an illuminating beam of light is divided into two beams by virtue of double-refraction optically prior to incidence on the specimen and is recombined by further, compensatory, double refraction optically after transmission through the objective lens of the microscope, variable double-refracting means consisting of a serial train of birefringent optical components are employed for dividing each ray in the illuminating beam into two double-refracted rays having a variable relative angular inclination and a longitudinal movable real or virtual intersection point which inclination and intersection point are pre-selectable in different combinations by adjustment of the geometrical relationship existing between the components. In this way an invariant geometrical relationship between the divided rays emerging from the objective may be maintained thus permitting the use of a range of different objective lenses.

---

This invention is for improvements in or relating to interference microscopes and is concerned with the provision of a new and improved form of double-refracting interference microscope.

In interference microscopes of the kind in which the illuminating beam of light is divided into two beams by virtue of double-refraction optically prior to incidence on the specimen and is recombined by further, compensatory, double-refraction optically after transmission through the objective lens of the microscope, change of objective power involves the inconvenience of physically changing the double-refracting optical component(s) and changing the substage condenser. The necessity for this change of optical components is implicit in one of the essential conditions for optical interference to occur, namely that the recombined beams must present perfectly super-imposed images of the illuminated field of view. Incomplete super-position results in the super-position of mutually different regions of the illuminated field and optical coherence is destroyed because such regions are in random optical phase relationship.

Precise coincidence of the two fields demands that the double-refracting power exerted by the beam-dividing system of the microscope must precisely match that of the beam combining system as modified by the particular objective lens being used. When the objective lens is changed, an appropriate change must therefore be made to the double-refracting system, e.g. by exchanging the beam-dividing component(s) and/or the substage condenser.

It is an object of the present invention to provide a new and improved form of double-refracting interference microscope in which the effective double-refracting power of the beam dividing system can be adjusted (without physical exchange of components) to compensate for selected changes of objective power in order to maintain correct functioning of the interference system associated with said microscope.

A double-refracting interference microscope in accordance with the present invention comprises means for producing a beam of polarized light, variable double-refracting means consisting of a serial train of birefringent optical components for dividing each ray in said beam into two double-refracted rays having a variable relative angular inclination and a longitudinally movable reel or virtual intersection point which said inclination and intersection point are pre-selectable in different combinations by adjustment of the geometrical relationship existing between said birefringent optical components, condensing means for focusing said beam whereat a specimen may be supported, objective means for forming an image of the specimen, birefringent recombining means for redirecting each pair of said double-refracted rays into mutual coincidence in a spatial region optically conjugate with the image of said specimen formed by said objective lens and analyzing means for bringing the differently polarized double-refracted rays into a common state of polarization whereby the aforementioned image exhibits visible interference effects spatially associated with the optical phase-differentiated structural features of said specimen.

Preferably, the variable double-refracting means contains a serial train of independently variable transversely double-refracting groups of birefringent components.

The number of such independently variable groups is preferably two.

Each such variable group of birefringent components preferably contains a pair of birefringent components whose spatial relationship is variable, whereby their combined effect is to vary the angular and/or transverse separation of the double-refracted rays in response to said variable spatial relationship.

At least one said pair of birefringent components preferably consists of two similar birefringent lenses which are relatively decentrable and relatively oriented in such a manner that their corresponding polarization extinction directions are mutually crossed.

Both pairs of birefringent components preferably each consists of two similar birefringent lenses which are relatively decentrable and relatively oriented with their corresponding extinction directions mutually crossed.

However, at least one pair of birefringent components may consist of two similar birefringent plates whose angular relationship is variable.

Preferably, said plates precede and follow an intervening 90° vibration rotator, e.g. a half-wave plate or plates, and have their corresponding extinction directions substantially parallel to each other.

In order that the invention may be more clearly understood, two embodiments thereof will now be described, by way of example, with reference to FIGS. 1 and 2 of the accompanying drawings which are each a schematic representation of one form of apparatus.

Referring to FIG. 1, the representative axial ray 11 in an illuminating beam of light passes through a field-diaphragm 12 and is then polarized by transmission through a polarizing plate 13. Thereafter, ray 11 is double-refracted into rays 11a and 11b by transmission through a first variably decentrable birefringent lens doublets 14 and 15. Because the birefringent components 14b and 15a have the same lenticular curvature and are mutually oriented with their corresponding extinction directions crossed, they are optically equivalent to a birefringent double-image prism, e.g. a Wollaston prism, whose angle is proportional to the amount of relative decentration. The resulting angular divergence of rays 11a and 11b is therefore continuously variable by manual adjustment of the relative decentration of the doublets 14 and 15.

Rays 11a and 11b are subsequently rendered mutually convergent by a second pair of relatively decentrable birefringent double lenses, 16 and 17. The rays are then further converged by the substage condenser 20 of the microscope and pass through a specimen plane 0–0″, to one of the objective lenses 21 of the microscope.

Rays 11a and 11b are re-converged by objective lens 21 to an intersection point substantially at a birefringent wedge 23, where they are re-combined by double-refraction and continue to the image plane in the conventional manner. An analyzer plate, 24, is included to bring rays 11a and 11b into parallel plane polarized relationship to establish the coherence condition necessary for optical interference to occur.

The first focal plane 19 of the condenser and the anterior focal plane 22 of the objective lens are indicated in order to emphasise that it is not essential to the invention that the divided pairs of double-refracted rays should intersect at these planes.

Dashed rays, 11c and 11d indicate image-bearing rays diffracted by a translucent object 0–0′.

The relative angular deviation imparted to the rays 11a and 11b by the plano-concave birefringent lenses 14b, 15a and 16b, 17a can be obtained from the following expression.

$$D_1 - D_2 = S(n_1 - n_2)/r$$

where $D_1$ and $D_2$ are the respective angular deviations imparted to the orthogonally polarized double-refracted component rays, $S$ is the relative decentration of the lenses, $n_1$ and $n_2$ are the effective refractive indices of the birefringent material and $r$ is the radius of curvature of said lenses. This is an approximate formula whose accuracy is adequate when $r > 10s$. In practice, the accuracy can be low by virtue of the infinite variability of the decentration.

A suitable material for the birefringent lens components is crystalline quartz, with the optic axis of the crystal perpendicular to the instrumental axis. As indicated in the drawing, the optic axes should be mutually crossed for each pair of lenses. The direction of decentration of both pairs of lenses 14 and 16 should be substantially parallel to the direction of image-shear produced by the beam-combining member 23a and 23b.

The polarizer 13 and analyzer 24 are preferably mutually crossed and diagonally oriented relative to the extinction directions of the birefringent components.

If the beam-combining number 23a, 23b has only one birefringent component (as shown) then the resulting relative optical path difference between the recombined component rays can be substantially compensated by making one of the birefringent lenses appropriately thicker or thinner than the other three birefringent lenses. The precise point of path compensation can then be obtained by moving the element 23a, 23b in a direction parallel to its effective principal section or direction of image shear.

The necessary user adjustments of the lenticular decentring controls are facilitated if the substage condenser images the region occupied by the doublets 14 and 15 in the plane of the specimen at 0–0. The user can then proceed by first adjusting the decentration of the doublets 16 and 17 until interference contrast is optimized in the field of view conjugate with the selection plane 0–0 and then adjusting the doublets 14 and 15 to control or eliminate fringes or interference gradients seen in the same field.

The ray-paths in the drawing imply that both these adjustments have been correctly performed so that there is no interference gradient in the field of view.

It will be apparent to all skilled in the art that the glass component of each decentrable doublet should have substantially the same dioptric power as the mean dioptric power of the associated birefringent component. Otherwise, the decentring adjustments would have the unwelcome effect of decentring the light path through the instrument. Thus, the plano-convex form of the glass components indicated in FIG. 1 implies that the refractive properties of their material substantially match those of the associated birefringent components. If suitably matching glasses are not available, the plan surfaces would have to be replaced by spherical ones of suitable curvature.

Referring now to FIG. 2, the form of apparatus shown therein incorporates many of the components of FIG. 1 for which the same reference numerals have been employed. However, the doublets 14 and 15 of FIG. 1 have been replaced by a pair of similar plates 34 and 35 of optically anisotropic uni-axial material cut obliquely to the optic axis of the crystal with the interposition of a half-wave birefringent retardation plate doublet 34a whose elements are mutually oriented at 45°. Furthermore the birefringent wedge 23 is replaced by a positive singlet lens of glass 36, a half-wave birefringent retardation plate 37 whose extinction directions make angles of about 22½° with diagonal sections of the optical system, two similar plates 38 and 39 of uniaxial crystalline material cut obliquely to the optic axis and connected together in crossed orientation and a negative glass lens 40.

Considering the figure in detail, the representative ray 11 in the illuminating beam of light is plane polarized by transmission through the polarizer 13 before being double-refracted in the platal elements 34 and 35. These plates, together with the intervening half-wave plate combination 34a, comprise the essential elements of the well-known double-refracting interferometer of Jamin. When the elements 34 and 35 are in mutual optical parallelism, the double refraction of 34 is neutralized by an equal and opposite double-refraction in the element 35 due to the light-vibration exchanging function of the combination 34a. However, tilt of the element 35 about axis X changes the double-refracting power of the element 35 and so results in a corresponding lateral separation of the double-refracted rays emerging from the element 35.

The double-refracted rays leaving the element 35 are thereafter divergently double-refracted by transmission through a pair of doublet lenses 16 and 17 and the relatively divergent rays 11a and 11b emerge from 17 with an angular divergence which can be adjusted by appropriate relative decentration of the lenses 16 and 17 as for FIG. 1. After passing through the substage condenser 20 the rays 11a and 11b pass along separate paths through the plane 0—0 whereat the specimen is supported.

The microscope objective lens 21, then converges the rays through an intersection position whence they diverge towards the double-refracting recombining means, 36 to 39.

Compensation for variation in the point of intersection of the divided rays following changes in the power of the objective is achieved by tilting the element 35 about X, thus introducing the appropriate amount of lateral ray separation to restore the standard intersection position when the objective 21 is changed.

The remaining geometrical variation between the two divided rays arising from change of objective power is change of their relative angular inclination on leaving the lens 21. This variation is compensated for by adjusting the relative decentration of the lenses 16 and 17 to produce the correct amount of angular inclination between the rays.

After leaving the objective 21, the divided rays are refracted into mutual parallelism by the positive glass lens 36 whose first focal plane is located at the plane of intersection of the rays. The vibration directions of the divided rays are then rotated into coincidence with the extinction directions of the double-refracting doublet plates 38 and 39 by the half-wave plate 37. The recombined rays leaving 39 are brought into a common state of polarisation by transmission through the analyser 24 so that they mutually interfere in a manner dependent upon the refractile structure of the specimen at 0—0. The negative lens 40 compensates for the dioptric power of the lens 36 so as to maintain the standard distance of the image of the specimen from the objective 21. The recombined interfering rays thereafter proceed to any of the viewing and/or recording means familiar in the art.

An alternative means for adjusting the overall relative retardation of the complete interference system is provided by tilting plate 34 about the axis Y—Y.

The combination 36–40 could be replaced by the well-known Nomarski modification of the Wollaston prism which places the fringes outside the prism itself or by a simple wedge as shown in FIG. 1 (23a and 23b).

If the apparatus of FIG. 2 is to be used in white light it would be advantageous to replace the single half-wave of the Jamin double-refracting interferometer with a combination of birefringent retardation plates whose resultant effect would be to impart the necessary 90° rotation for a wider region of the spectrum than is possible with a single half-wave plate. A substantial improvement can be achieved by using a pair of half-wave plates whose extinction directions are diagonally oriented to each other.

It will be seen that in both the above arrangements, the double-refracting components below the condenser 20 can be adjusted to maintain an invariant geometrical relationship between the divided rays emerging from the objective 21, thus permitting the use of an entire range of different objective lenses.

It will be appreciated that the ray separation indicated in both FIGS. 1 and 2 has been exaggerated in the interests of clarity. The invention is not restricted to any precise amount of ray separation and, in fact, the separation may be made smaller than the theoretical limit of lateral resolution of the objective lens. When thus designed and appropriately adjusted the resulting instrument produces an interference field in which the localized optical path-differences are proportional to the first derivative of the specimen's optical path profile.

What is claimed is:

1. A double-refracting interference microscope comprising means for producing a beam of polarised light, variable double-refracting means consisting of a serial train of birefringent optical components for dividing each ray in said beam into two double refracted rays having a variable relative angular inclination and a longitudinally movable real or virtual intersection point which said inclination and intersection point are pre-selectable in different combinations by adjustment of the geometrical relationship existing between said birefringent optical components, condensing means for focussing said beam whereat a specimen may be supported, objective means for forming an image of the specimen, birefringent recombining means for re-directing each pair of said double-refracted rays into mutual coincidence in a spatial region optically conjugate with the image of said specimen formed by said objective lens and analyzing means for bringing the differently polarized double-refracted rays into a common state of polarization whereby the aforementioned image exhibits visible interference effects spatially associated with the optical phase-differentiated structural features of said specimen.

2. A microscope as claimed in claim 1, wherein the variable double-refracting means contains a serial train of independently variable transversely double-refracting groups of birefringent components.

3. A microscope as claimed in claim 2, wherein the number of such independently variable groups is two.

4. A microscope as claimed in claim 3, wherein each variable group of birefringent components contains a pair of birefringent components whose spatial relationship is variable whereby their combined effect is to vary the angular and/or transverse separation of the double-refracted rays in response to said variable spatial relationship.

5. A microscope as claimed in claim 4, wherein at least one said pair of birefringent components consists of two similar lenses which are relatively decentrable and relatively oriented in such manner that their corresponding polarization extinction directions are mutually crossed.

6. A microscope as claimed in claim 4, wherein at least one pair of birefringent components consist of two similar birefringent plates whose angular relationship is variable.

7. A microscope as claimed in claim 6, wherein the plates precede and follow an intervening 90° vibration rotator, and have their extinction directions substantially parallel to each other.

References Cited

UNITED STATES PATENTS 2,924,142   2/1960   Nomarski.

DAVID SCHONBERG, Primary Examiner

P. R. MILLER, Assistant Examiner

U.S. Cl. X.R.

350—13, 157, 159